(12) United States Patent
Wang et al.

(10) Patent No.: US 8,881,236 B2
(45) Date of Patent: Nov. 4, 2014

(54) METHOD AND APPARATUS FOR A CONTROL PLANE TO MANAGE DOMAIN-BASED SECURITY AND MOBILITY IN AN INFORMATION CENTRIC NETWORK

(75) Inventors: Guoqiang Wang, Santa Clara, CA (US); Xinwen Zhang, San Jose, CA (US); Ravi Ravindran, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 335 days.

(21) Appl. No.: 13/352,835

(22) Filed: Jan. 18, 2012

(65) Prior Publication Data
US 2012/0204224 A1 Aug. 9, 2012

Related U.S. Application Data

(60) Provisional application No. 61/439,769, filed on Feb. 4, 2011.

(51) Int. Cl.
*G06F 7/04* (2006.01)
*H04L 29/08* (2006.01)
*H04W 4/08* (2009.01)

(52) U.S. Cl.
CPC ............. *H04L 67/2819* (2013.01); *H04W 4/08* (2013.01); *H04L 67/327* (2013.01)
USPC .......................................................... 726/3

(58) Field of Classification Search
USPC ................. 726/3; 713/151, 153; 709/223, 238
See application file for complete search history.

(56) References Cited

U.S. PATENT DOCUMENTS

| 7,287,093 B2 | 10/2007 | Lynch et al. |
| 7,949,785 B2 * | 5/2011 | Alkhatib et al. ............... 709/245 |
| 2002/0055989 A1 | 5/2002 | Stringer-Calvert et al. |
| 2009/0285209 A1 | 11/2009 | Stewart et al. |

FOREIGN PATENT DOCUMENTS

| EP | 2124415 A2 | 11/2009 | |
| NL | 1011359 C1 | 3/1999 | |
| WO | WO99/35811 | * 6/1999 | .............. H04M 7/00 |

OTHER PUBLICATIONS

Foreign Communication From a Counterpart Application, PCT Application No. PCT/CN2012/070889, International Search Report dated May 10, 2012, 6 pages.
Foreign Communication From a Counterpart Application, PCT Application No. PCT/CN2012/070889, Written Opinion dated May 10, 2012, 3 pages.
Foreign Communication From a Counterpart Application, European Application No. 12741588.3, Extended European Search Report dated Apr. 14, 2014, 7 pages.

(Continued)

*Primary Examiner* — Beemnet Dada
(74) *Attorney, Agent, or Firm* — Conley Rose, P.C.; Grant Rodolph; Brandt D. Howell

(57) ABSTRACT

A networking system comprising a virtual group controller in an information centric network configured to enable mobility and security for a plurality of users groups of the information centric network, a plurality of user groups coupled to the virtual group controller and associated with the users, a plurality of agents that are each associated with one of the user groups, and a database for trusted service profile coupled to the virtual group controller, wherein the virtual group controller is configured to interact with the agents to enable mobility for the user groups using a server-less domain-based naming scheme.

13 Claims, 11 Drawing Sheets

(56) References Cited

OTHER PUBLICATIONS

Van, J., et al., "Networking Named Content," Conext '09, Proceedings of the 5th International Conference on Emerging Networking Experiments and Technologies, XP002608160, Oct. 13, 2009, 13 pages.

Al-Mukaddim, K., et al., "A Taxonomy and Survey of Content Delivery Networks," Grid Computing and Distributed Systems (GRIDS) Laboratory, Department of Computer Science and Software Engineering, XP008110709, Feb. 12, 2006, 44 pages.

Jaehoon, K., et al., "Content Centric Network-based Virtual Private Community," 2011 IEEE International Conference on Consumer Electronics (ICCE), Jan. 9, 2011, XP031921543, pp. 843-844.

Ravishankar, R., et al., "Towards Secure Mobile Virtual Group in Information-Centric Network," 2011 IEEE 5th International Conference on Advanced Networks and Telecommunication Systems (ANTS), Dec. 18, 2011, XP032125679, 3 pages.

\* cited by examiner

METHOD AND APPARATUS FOR A CONTROL PLANE TO MANAGE DOMAIN-BASED SECURITY AND MOBILITY IN AN INFORMATION CENTRIC NETWORK

CROSS-REFERENCE TO RELATED APPLICATIONS

The present application claims the benefit of U.S. Provisional Patent Application No. 61/439,769 filed Feb. 4, 2011 by Guo-Qiang Wang et al. and entitled "Method and Apparatus for a Control Plane to Manage Domain-Based Security, Mobility and Social Groups in a Content Oriented Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture in which the focus is on locating and providing information to users rather than on connecting end hosts that exchange data. One type of ICN is a Content Oriented Network (CON). In a CON, also referred to as a Content Centric Network (CCN), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In one embodiment, the disclosure includes A networking system comprising a virtual group controller in an information centric network configured to enable mobility and security for a plurality of users groups of the information centric network, a plurality of user groups coupled to the virtual group controller and associated with the users, a plurality of agents that are each associated with one of the user groups, and a database for trusted service profile coupled to the virtual group controller, wherein the virtual group controller is configured to interact with the agents to enable mobility for the user groups using a server-less domain-based naming scheme.

In another embodiment, the disclosure includes a network component operating at a control plane comprising a receiver configured to receive a request through an information centric network, wherein the request is associated with a user device in a user group, a virtual group controller configured to operate at the control plane to determine a domain for the user device based on a domain name obtained from the request, route the request properly by mapping a name for the user device in the request using trusted service profile information, and a transmitter configured to forward the request to the domain for the user device.

In a third aspect, the disclosure includes a method implemented on a network component for providing an interest to a mobile device, comprising receiving, at a virtual group controller operating in a control plane in an information centric network, a request to the mobile device from a group proxy, wherein the group proxy receives the request from a peer device, mapping with the virtual group controller the request to an access point for the mobile device using a trusted service profile for the mobile device, and sending, with the virtual group controller, the request to the access point for the mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a CON, content delivery or dissemination including publishing, requesting, and managing (modification, deletion), and other functions may be based on content name and not location. The CON may also provide a caching feature for real time data, e.g., as data is fetched by users, and/persistent data by users or third party content providers 140, such as enterprises or social networks. One of the aspects of the CON that is different from traditional Internet Protocol (IP) networking is that content reachability may be determined by the content name, e.g., instead of the address of the device that hosts the content. Unlike the case of a traditional IP network that may be address-based, in a CON system, the service-enabled functional building blocks may be implemented over a name-based foundation. These functional building blocks or network service control functions (entities) may include functions for security, mobility, social grouping, multicasting, real time processing, and other functions. In IP networks, the content may be stored and fetched at a hosting system (e.g., Google server), while in the CON, the content may be replicated and retrieved at many content routers. Replicating content at multiple content routers may cause fundamental impacts when network service control functions shift from a centralized portal to distributed and local portals.

Disclosed herein is a system and methods for implementing a SMVG control system. The SMVG system may support multiple service-supporting wares, including security, mobility, and social grouping, to manage trusted service profiles for CON users and user groups. Since the domain-based CON may be configured or built in a distributed manner, the SMVG implementation may be name-based and server-less in nature. A domain-based naming structure may be used in the SMVG system to identify each named object. The domain-based naming structure may serve as a control plane platform that allows the CON to pick and mix the named objects for users/user-groups to provide trusted service flows with privacy, security, mobility and social networking capability. A SMVG controller may serve as a control plane entity that uses and manages the trusted service profiles in a dynamic and distributed manner. The controller may implement intra-domain and inter-domain operations, as described further below.

Figure 1:
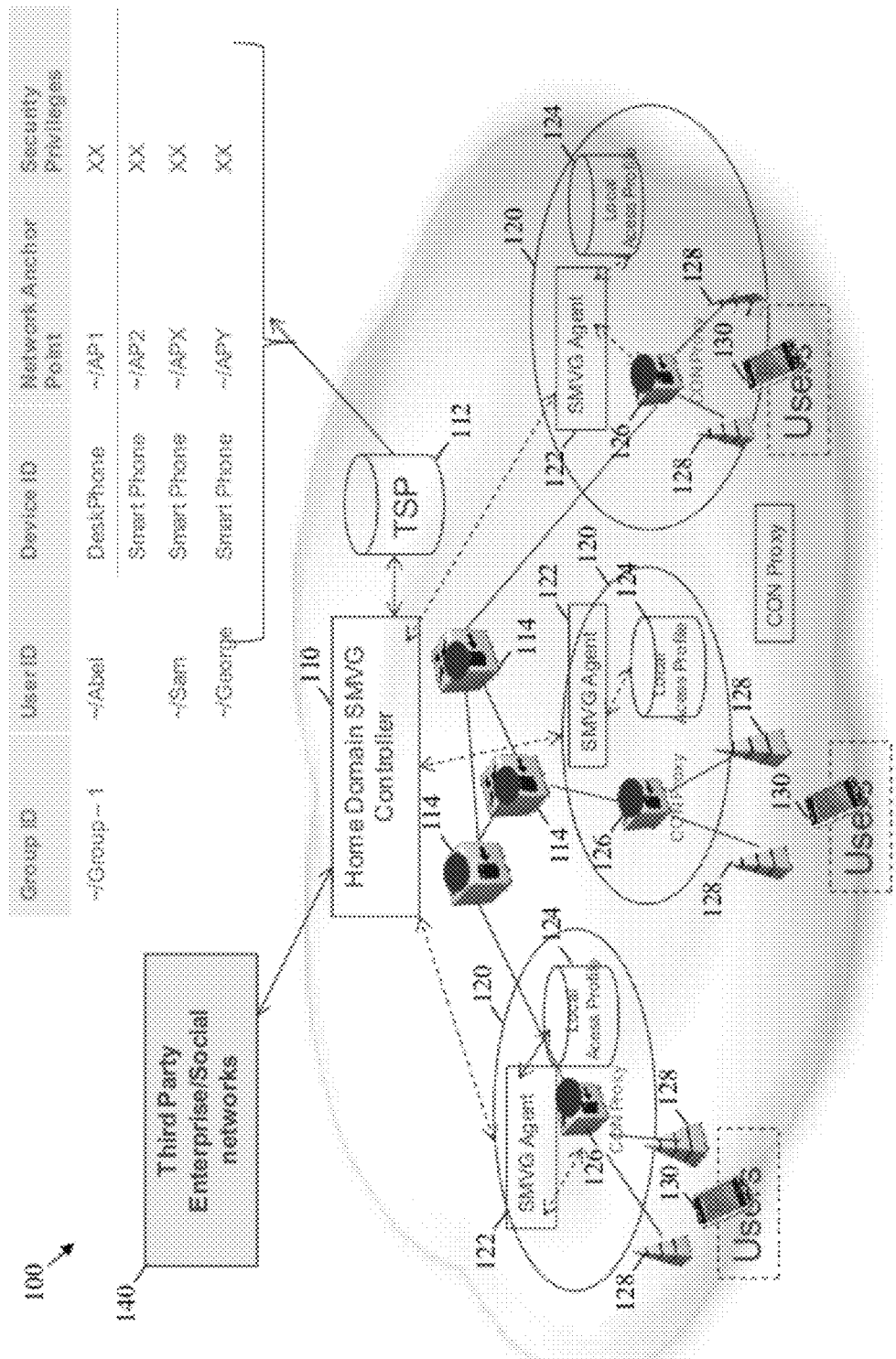
FIG. 1 is a schematic diagram of one embodiment of a CON including a domain-based secured mobile virtual group (SMVG) control system.

FIG. 1 illustrates an embodiment of a CON 100 that may implement a SMVG control system where content may be routed based on name prefixes and delivered to users or customers based on request. CON 100 is an example of an ICN. However, the methods, systems, and apparatuses disclosed herein may be implemented with other types of ICNs other than a CON. The CON 100 may comprise a plurality of user groups 120, which may be SMVGs or secured virtual groups (SVGs). The SMVG control system may comprise a SMVG controller 110 coupled to a trusted service profile (TSP) database 112, e.g., in a home domain, and to the user groups 120. The user groups 120 may be located in the CON 100, e.g., in the home domain or in a plurality of domains, or may be located in a plurality of visiting access domains in one or a plurality of visiting access networks. For instance, the domains may comprise IP domains, a Multiprotocol Label Switching (MPLS) domains, Ethernet domains, or combinations thereof. Each user group 120 may be associated with a SMVG agent 122 coupled to the SMVG controller 110, and a local access profile database 124 and a CON proxy nodes 126 coupled to the SMVG agent 122. The CON proxy 126 may also be coupled to one more access devices or access points (APs) 128 configured to communicate with a plurality of user devices 130 at each user group 120. In an embodiment, the APs 128 may comprise base stations configured to communicate wirelessly (via wireless links) with the user devices 130, such as mobile smartphones or other mobile devices. The components of the CON 100 may be arranged as shown in FIG. 1. The SMVG controller 110 and SMVG agent 122 may be functions implemented using hardware, software, or both. The CON proxy 126 may correspond to an edge content router in the CON 100.

The CON 100 may comprise a plurality of content routers 114, including the CON proxy nodes 126 at the user groups 120. The CON 100 may also comprise a plurality of internal nodes, such as routers, bridges, and/or switches (not shown). The content routers 114 and internal nodes may be coupled to each other via network links, e.g., fixed connections. Some of the content routers 114, e.g., the CON proxy nodes 126, may also be coupled to a plurality of customer nodes, including the user devices 130, and/or customer sites directly or via the APs 128 and optionally a plurality of access networks (not shown). The content routers 114 and internal nodes may be any nodes, devices, or components that support transportation of traffic in the CON 100 and between the CON 100 and external components, such as the user devices 130. The content routers 114 may be edge nodes, such as the CON proxy nodes 126, that forward content traffic from the internal nodes and/or other content routers 114 to the customer nodes, including the user devices 130, and/or the customer sites, e.g., based on a customer request or demand. The content routers may also receive content requests from the customer nodes. For example, the content routers 114 may be routers or bridges, such as backbone edge bridges (BEBs), provider edge bridges (PEBs), or label edge routers (LERs) that forward content based on content name prefixes. The content routers 114 and internal nodes may comprise or may be coupled to a plurality of content servers that store or cache content, which may be provided to customers or subscribers, e.g., upon demand. Additionally, the content routers 114 may comprise content stores that may be configured to cache at least some of the content forwarded in the CON 100.

The customer nodes may be nodes, devices, or components configured to deliver content to a user or customer and receive content requests from the user or customer. For instance, the customer nodes including the user devices 130 may be fixed or mobile user-oriented devices, such as desktop computers, notebook computers, personal digital assistants (PDAs), or cellular telephones. Alternatively, the customer nodes may be connectivity devices at customer premises, such as modems or set-top boxes. The customer nodes may also comprise customer equipment (not shown) that may be configured to receive content from the content routers, via the access networks, and distribute the content to a plurality of customers. For instance, the customer nodes may comprise an application server and associated Virtual Machines; data center storage devices; optical network terminals (ONUs) and/or very high bit rate Digital Subscriber Line (VDSL) transceiver units at residential locations (VTU-Rs). The access networks may be any networks that provide access to the content in the CON 100, such as Virtual Private Networks (VPNs). The customer sites may be any sites or office environments configured to receive content from the content routers and may send the content to corresponding customer nodes, via the access networks. The customer sites may also receive content requests from the customer nodes and send the content requests to the content routers.

The SMVG control system may be a domain-based control plane platform that is configured to allow the CON 100 to select and combine the named objects for specific users/user-groups to provide trusted service flows with privacy, security, mobility and social networking capability. Specifically, the SMVG controller 110 may be a control plane entity located at a home domain and configured to use and manage trusted service profiles in a dynamic and distributed manner in the CON 100, as described further below. The SMVG controller 110 may be located at or correspond to a node or a network component, such as a router (e.g., a content router 114), an internal node, or a server.

In terms of a relationship between a service subscriber and supplier, trust may include service security, service quality, and service accountability associated, e.g., based on a set of rules to be enforced as expected. In the CON 100, the service subscriber and supplier may correspond to a content subscriber and publisher, respectively, such as users of the user devices 130. The SMVG controller 110 may be configured to create, maintain, validate, enforce, and trace/measure the trust service relationship among users/user-groups, applications, mobility, security, and user/network devices, for instance, within a determined time (e.g., time of day (TOD), Duration, or time to live (TTL)). This trust relationship may be described and enforced by a Profile.

The SMVG control system may support multiple users/user-groups, for instance in a mobile environment of the CON 100. In a single domain case, the SMVG controller 110 may reside in a home-domain and collaborate with multiple user groups 120. Alternatively, the user groups 120 may be distributed at one or more visiting access domains within the CON 100 or at a plurality of external access networks coupled to the CON 100. The SMVG agent 122 may be located at or correspond to a node or a network component, such as a router (e.g., a content router 114), an internal node, or a server. The SMVG controller 110 may collaborate with the SMVG agent 122 within the context of a virtual group ensuring security and mobility functions.

The TSP database 112 may be configured to manage the user groups 120. Each user group 120 may be identified by an identifier (ID), which may be unique if global mobility is desired, a list of members, and metadata related to security functions (e.g., key distribution, integrity, confidentiality) and social interaction. Additionally, the TSP database 112 may link up with external third party entities, such as social networks or VPNs, to allow application/context user group interaction, which may be enabled over a service provider (SP) network for customized treatment with respect to network resources. The information in the TSP database 112 may comprise a plurality of associations or entries (e.g., in a TSP table) that associate user IDs, device IDs, group IDs, network anchor points, security privileges, or combinations thereof.

A domain, e.g., the home domain in the CON 100, may be a set of objects which are constructed and constrained by some relationships, such as administrative relations, ownership relations, social relations, geographical relations, topological relations, other defined relations, or combinations thereof. Each domain may have a name that represents the "realm" of the objects in the scope of the domain. Each object in a domain may also have a name that may use the domain's name as a prefix. A domain may be built recursively (i.e., a domain may contain sub-domains), and thus each object in the domain may be assigned a hierarchical name. For example, the name www.hollywood.com/movie/new release/The_Company_Men may be used, where the movie "The_Company_Men" is owned by Hollywood, and "Hollywood" is the home domain of the named movie.

The SMVG agents 122 may collaborate with CON proxy nodes 126, e.g., which may be located at visiting access networks, to manage mobility, security key distribution, and social ownership. The operations may be based on the name of objects involved in content dissemination. The named objects may include users, user devices, access points, social groups, SMVG controller and agent, other objects, or combinations thereof. In this context, the user devices' names may not be necessarily "globally reachable", i.e., may be the local names. However, the home domain SMVG controller's name and the visiting AP's name (for example, $4^{th}$ generation (4G) wireless base stations (BS) or Gateways) may be "globally reachable". The globally reachable name may also be referred to as a "well-known" name, from content routing perspective. The local access profile database 124 may be configured to store registration information of the user devices 130.

The SMVG control system may also provide service assurance within a domain. The interaction between a third party whose groups are being handled and the CON SP may be within the boundaries of not violating user rights and privileges. In one scenario, the SP may interact with the third parties to map the SP's subscribers to known social networks, and hence use the subscribers' behavioral statistics, which may be obtained from the social networks, to promote the SP's services, such as an advertising service. In another scenario, the SP may map the subscribers or users to one or more virtual private group (VPG) instances on the network's content routers, e.g., to provide guaranteed performance with respect to content dissemination over the SP's domain.

In an embodiment, the CON 100 may also comprise a plurality of content routers 114 that may be positioned between the SMVG controller 110 and the SMVG agents 122. Each of such content routers 114 may be configured to forward or enable communications between the SMVG controller 110 and the corresponding SMVG agent 122 in a corresponding user group 120. Each content router 114 and a corresponding CON proxy node 126 may be associated with a corresponding VPG instance. Accordingly, the user devices 130 in communications with the CON proxy node 126 may be mapped to the same VPG instance by the SP.

In the CON 100, the SMVG controller 110 and the SMVG agents 122 may communicate with the CON proxy nodes 126 to support security, mobility, and social networking, under a plurality of scenarios. The scenarios below describe how service profiles may be created, maintained, and used for these supported services. In this context, the SMVG controller 110 and the SMVG agents 122 may be control plane entities, and the CON proxy nodes 126 may be content data transport plane entities. This SMVP control system may provide an integrated and collaborated service control plane that is based on a server-less architecture and is separated from the content data transport plane.

The SMVG control system in the CON 100 may implement a domain-based naming scheme, where each established domain may represent a set of objects. The set of objects may be constrained by some relationships, as described above. Each established domain may represent a realm which has a domain name. Within this realm, all objects may be named starting from the domain name, which may be used as the prefix of the names of the objects. The domain name may be known, i.e., may be globally routable in the CON 100. In the CON infrastructure, every element or object may be a named object and every object may belong to a domain. Specifically, each mobile device 130, user, user group 120, AP 128, SMVG controller 110, and SMVG agent 122 may be named with a selected domain name as a prefix and may each belong to a selected domain. A plurality or all domain names may be globally routable in the CON 100. Each AP 128 may be also assumed globally routable. For example, a long term evolution (LTE) base station at Santa Clara, Calif., which may be owned and operated by AT&T, may be named as top/att.us/CA/SantaClara/BS-1, where "top" represents a virtual name, which may represent an abstract organization or a technology such as "www" name.

The SMVG control system may also implement a registration and ID management procedure, for instance after a user device 130 attaches to an AP 128 of the CON 100. While the AP 128 conducts device/user authentication, the AP 128 may learn (or derive) the home domain from the prefix of the mobile device name. This may be applicable to the case where the mobile device 130 belongs to the AP's 128 domain and also to the case where the mobile device 130 and the AP 128 belong to different domains. In the latter case, the mobile device operator (e.g., telco) may have to verify if the operator's service license agreement (SLA) policies allow accepting or authorizing the mobile device 130 at a visiting access domain.

After finishing the registration of the mobile device 130 in a local access profile 124, the local SMVG agent 122 may send profile registration messages to the home SMVG controller 110. The destination name for the registration message may be determined by a domain name abstracted from the user device 130 name (or in conjunction with user name). The registration message may comprise the mobile device name (e.g., user-domain/user-name/My.IPhone) and the AP's name (e.g., top/att.us/CA/SantaClara/BS-1). These two names may be stored in the TSP database 112 at the home domain, and may be used to establish a binding relation between user device 130 and the AP 128. This binding relation may be updated in a dynamic manner, e.g., when the mobile device changes its attachment (e.g., roaming, handover, nomadic move, off-hook, etc.)

The registration may be achieved multiple times, for instance, if a user owns multiple devices, which may include mobile and/or fixed devices, and/or due to policy updates between the AP 128 and the mobile device 130. The user may also switch between the devices in real time. The registration may create corresponding entries in the TSP database 112 or table at the home domain. The TSP database 112 or table may have additional fields for service-enabling and management purposes. For example, the TSP table may comprise a caller name field to indicate what kind of calls should go to which devices (e.g., personal mobility). The TSP table may also comprise a social group ID that indicates the user's group. The TSP table may also comprise a key locator that indicates what cryptographic materials have been assigned to the mobile device 130. The TSP table may also include various policies for ID management, access control, service security, quality of service (QoS), and/or location management (mgmt). The TSP database 112 or file may contain both statically registered fields (e.g., when user account was created at the home domain or a third party domain, such as a social group and a personal profile) and dynamically registered fields (e.g., when the mobile device 130 attaches to a visiting access network).

The SMVG control system may also support user mobility in the CON 100. In an embodiment, the SMVG control system may implement three types of mobility control: handover, nomadic, and global roaming. Typically, handover between two base stations or APs 128 (e.g., under the control of the same gateway, such as a Worldwide Interoperability for Microwave Access (WiMAX) or LTE gateway) may be handled by layer two (L2) wireless access. The CON 100 at the named object level may require support for nomadic movement of mobile device 130 and global roaming. Using the domain-based naming scheme described above, every object name may have a domain-name prefix, and the domain name may be globally reachable in the CON 100. Thus, deriving the home domain name from a user device 130 name may not be difficult. The SMVG controller 110 and SMVG agent 122 in the CON 100 may also support name-based mobility.

When a mobile device 130 attaches to a visiting access network, the local SMVG agent 122 may be triggered to send a registration message to the home domain SMVG controller 110. The mobile devices' home domain name may be derived from the mobile device name (or may be acquired from the data pre-configured on the user device 130). The registration message may comprise both names from the user device 130 and the AP 128. The SMVG controller 110 may record the binding data between the user device 130 and the AP 128 in a TSP profile. When a corresponding peer wants to send requests or interests to the mobile device 130 (e.g., issuing a phone call), the local SMVG agent 122 coupled to that AP 128 may first derive the home domain name from the called party's name, and send messages to the home SMVG controller 110 to resolve the current location of the called party. Next, the CON proxy 126 at the caller site may send interests to the far-end called party's site by concatenating the location-name (e.g., the caller party's AP name) as a prefix combined with the called party's name. Since the names from both APs 128 at the two parties may be globally routable, the communications between the caller and the called party may be efficiently established via the globally routable resolved name. In this case, the names of the caller and the called party may not be globally routable. In some cases, it may be difficult to populate caller/called party reachability to global network (even if the names are globally routable) due to the caller/called party dynamic mobility and routing protocol updating scalability.

Figure 2:
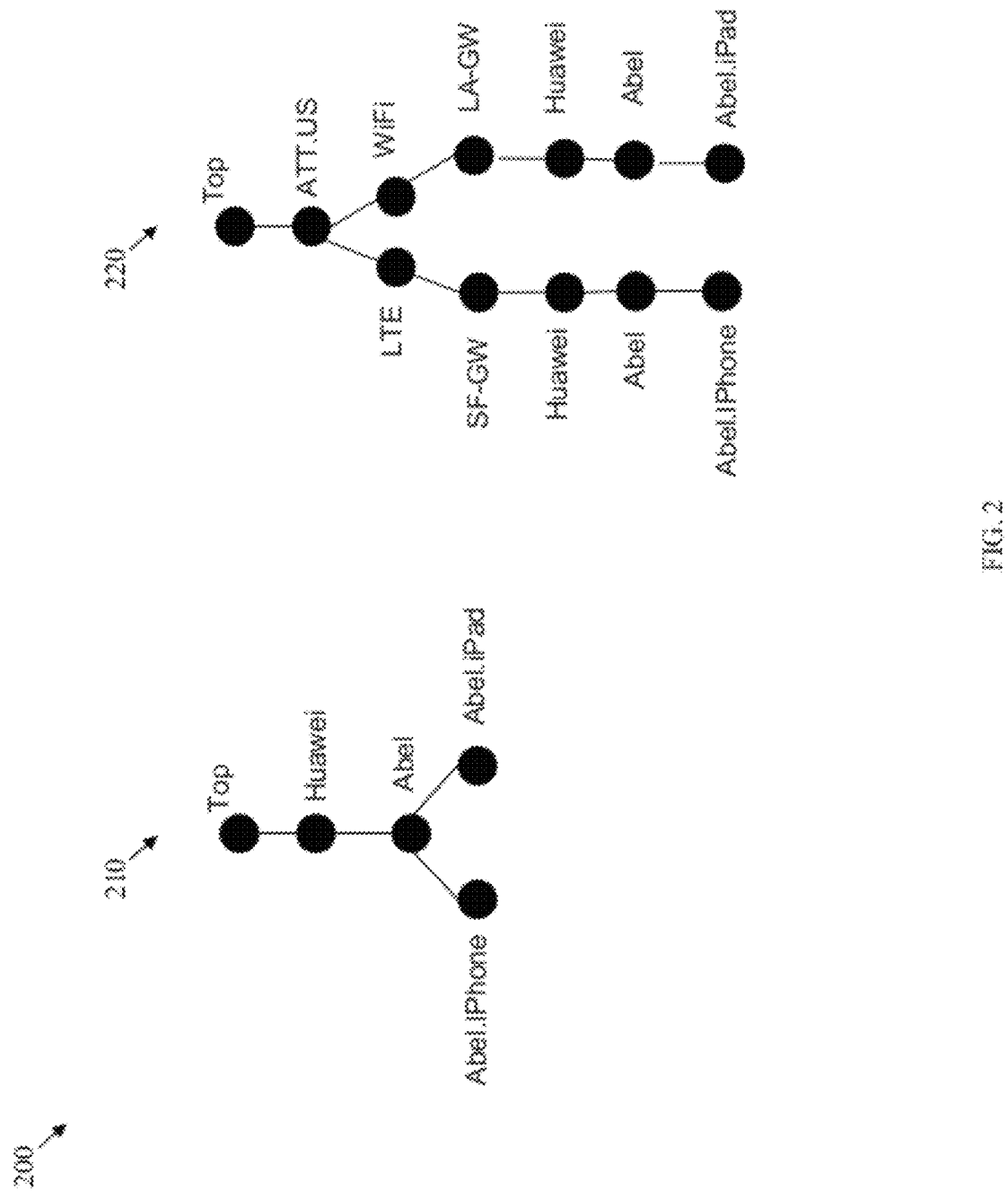
FIG. 2 is a schematic diagram of an embodiment of a name mapping scheme.

FIG. 2 illustrates an embodiment of a name mapping scheme 200 that may be used in a CON, e.g., similar to the CON 100, for instance as part of the SMVG control system described above. The name mapping scheme 200 may be used to map between home names 210 (in a home name hierarchy) and foreign names 220 (in a foreign name hierarchy). The home names 210 may be assigned from a home domain in the CON, and the foreign names 220 may be assigned from a visiting access domain. The home names 210 and the foreign names 220 may be globally routable in the CON but in different domains. For instance, the home names 210 may be used or routed in the home domain and may be mapped to the foreign names 220 in the corresponding visiting access domain. The foreign names 220 may be used and routed in the corresponding visiting access domains.

For instance, the home names 210 may be used for two user devices (mobile devices) registered for a user: top/Huawei/Abel/Abel.IPhone and top/Huawei/Abel/Abel.iPad. A user device may also have multiple foreign names (e.g., per Radio Access Network (RAN)). The foreign names 220 may be used for the two user devices in two corresponding visiting access domains or networks that may have different access technologies. A user device may obtain a foreign name when visiting an access domain or network. For instance, the foreign names 220 may be used for two different RANs: top/ATT.US/LTE/SF-GW/Huawei/Abel/Abel.IPhone for LTE access, and top/ATT.US/WiFi/LA-GW/Huawei/Abel/Abel.iPad.

The user device may register its foreign name at the home domain. The home name may be mapped to the foreign name at the home domain, e.g., when receiving or sending requests (interests) or replies comprising object names. The home SMVG controller may manage the mapping between the home domain and the foreign domain. The mapping scheme 200 may be used with an ID based Public Key Infrastructure (PKI) and implement per-domain policy control when mapping between the home name and the foreign name.

Figure 3:
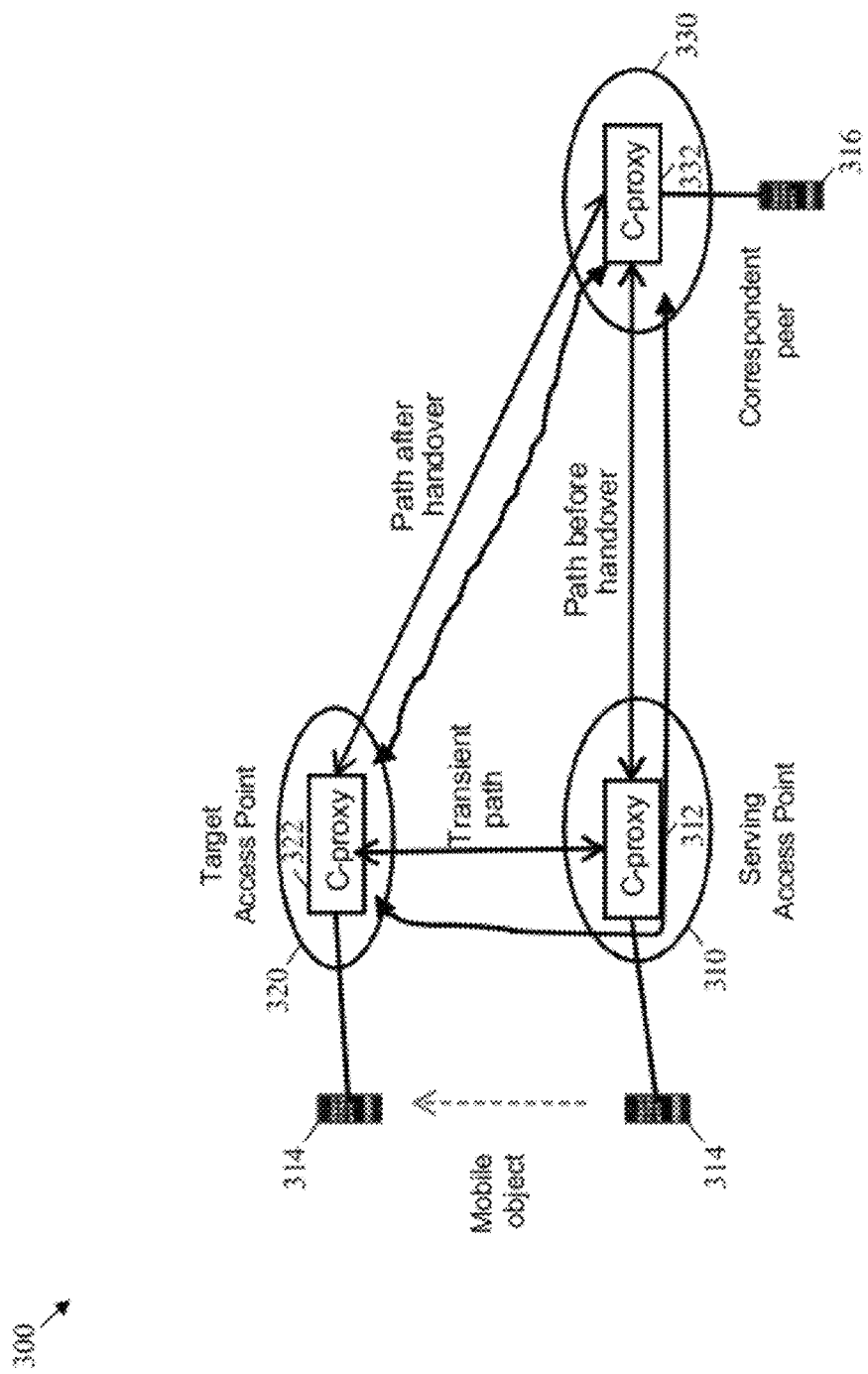
FIG. 3 is a schematic diagram of an embodiment of an inter-gateway mobility operation.

FIG. 3 illustrates an embodiment of an inter-gateway mobility operation 300 that may be used in a CON, e.g., similar to the CON 100, for instance as part of the SMVG control system described above. The inter-gateway mobility operation 300 may be implemented to handle proper forwarding of data to a mobile device when the mobile device moves between different APs at the CON, e.g., to maintain service continuation. The CON may comprise or may be coupled to a serving AP 310 coupled to a first CON proxy or serving proxy 312, a target AP 320 coupled to a second CON proxy or target proxy 322, and a correspondent peer access point (AP) 330 coupled a third CON proxy or peer proxy 332. The serving AP 310 may be linked to a first mobile device 314 that may move (during a handover) from the serving AP 310 to the target AP 320. The correspondent peer 330 may be linked to a second mobile device 316 that may be in communications (e.g., establishes a call) with the first mobile device 314. The serving proxy 312, the target proxy 322, and the peer proxy 332 may be CON-enabled gateways (or base stations) configured to couple or link user or mobile devices with the APs in the CON and allow communications between the CON and the devices.

The inter-gateway mobility operation 300 may correspond to a make-before-break scenario for inter-gateway mobility management. Before the first mobile device 314 moves from the serving proxy 312 at the serving AP 310 to the target proxy 322 at the target AP 320, the first mobile device 314 may start the attachment process with the target proxy 322/target AP 320. The first mobile device 314 may then inform the serving proxy 312 that the target proxy 322 is the targeting proxy for the move (handover). The serving proxy 312 may then notify the peer proxy 332 in the correspondent peer 330 of the name of the target proxy 322. Thus, the peer proxy 332 may use the name of target proxy 322 as prefix and concatenate this prefix with the name of the first mobile device 314 for data anchoring.

The serving proxy 312 may also use the name of the target proxy 322 to replace the name prefix in the received data. The received data, e.g., from the second mobile device 316, may target the first mobile device 314 using an old prefix (e.g., the name of the serving proxy 312). The name of the target proxy 322 may be used as a new prefix. The data may be sent from the peer proxy 332 to the serving proxy 312 via a first path (labeled "path before handover"). As such, the serving proxy 312 may route the received data to the target proxy 322. During the handover, the peer proxy 332 may bi-cast the data to both the serving proxy 312 and the target proxy 322. If the peer proxy 332 only anchors unicast traffic to the serving proxy 312, after the handover, the peer proxy 332 may switch the data to the target AP 320 using the new prefix, and the serving proxy 312 may shuffle or move the remaining data (received at the serving proxy 312) to the target AP 320 via a transient path. When all the data is switched or shuffled after the handover, the peer proxy 332 may send the data to the target proxy 322 via a second path (labeled "path after handover").

In an embodiment, when a mobile device or other object shifts its location within the same wireless access domain, an intra-domain handover may be handled by the wireless access network. When the gateway is Content-Oriented Network Architecture (CONA)-enabled, a CONA proxy may perform data anchoring functions for all or multiple base stations or APs within that domain. In both intra-gateway and inter-gateway handover scenarios, the CONA proxy may be able to perform data anchoring functions by using the entity's name. When the handover is successfully done, the local SMVG agent at a target AP may register to the home domain SMVG controller the new binding information, as described above.

The SMVG control system may also support user security in the CON (e.g., the CON 100) by enabling multiple security services for mobile devices with CON-enabled SMVG controller and proxy nodes. For data authenticity and integrity, each data in the CON may be signed by a private key from the publisher, e.g., with user, device, or application specific keys, and may be verified by the receiver by using the publisher's public key. Distributing these keys may lead to complexity of implementation. To simplify implementation, the SMVG control system may enable flexible data authenticity verification by leveraging domain-based named data. Specifically, as the AP may handle data publishing and subscribing operations for mobile devices, e.g., as an authenticator. The AP may offer certificate verification and data signature verification functions on behalf of the devices.

For example, based on a trust relationship established between the home SMVG controller at a home domain and the SMVG agent at a visiting AP in a visiting access domain, the SMVG agent may verify all certificates from mobile publishers belonging to that home domain. In this case, when a correspondent peer (AP) inquires the location of a mobile device, the home SMVG controller may send the mobile device certificates to the SMVG agent coupled to the correspondent peer. The SMVG agent may operate as a delegate of the correspondent peer to verify the certificates and then forwards the public key of the mobile publisher to the correspondent peer. This may save the cost of retrieving and verifying public key certificates of content publishers from the CON. Further, for publishing data, the AP may generate digital signatures on behalf of the mobile devices to insure data transport integrity. For example, when delivering the mobile publisher certificates from the home SMVG controller to the visiting SMVG agent, the named object may be insured by using credentials established between the SMVG controller and the SMVG agent. The secured name may also be applicable to inter-AP communications, e.g., based on a pre-established trust relationship between two APs (for both intra-domain and inter-domain). This may be useful since signing large data is typically an expensive operation for power constrained devices.

For privacy and confidentiality, the home SMVG controller may be leveraged as a key server and distributor. Specifically, when a mobile device is registered with its social group ID at a CON proxy via an AP, a new session key may be generated by the SMVG controller based on the domain name or group ID. To allow secured group communications between mobile devices, the key may be shared between all the devices within the same group, such that each device may use the group key to build logical secure communication channels to other peers (devices) in the group. The data published by a device may only be reachable to the devices in the same group. As such, the SMVG controller may become the key issuer, distributor, and group membership manager, based on device registration process and social value or context.

Further, the device's home SMVG controller may be the proxy for secured communications between other peers (devices) spanning multiple domains. This may enable a delegate model for trust relationship management for inter-domain communications. When devices in different domains are set up to form a secured group, the devices' corresponding home SMVG controllers may negotiate a unique session key for all the peers and distribute the key to the individual devices, e.g., with the public/private key pairs of devices registered on their home SMVG controllers. This may save computation and thus power for each mobile device for key agreement.

Figure 4:
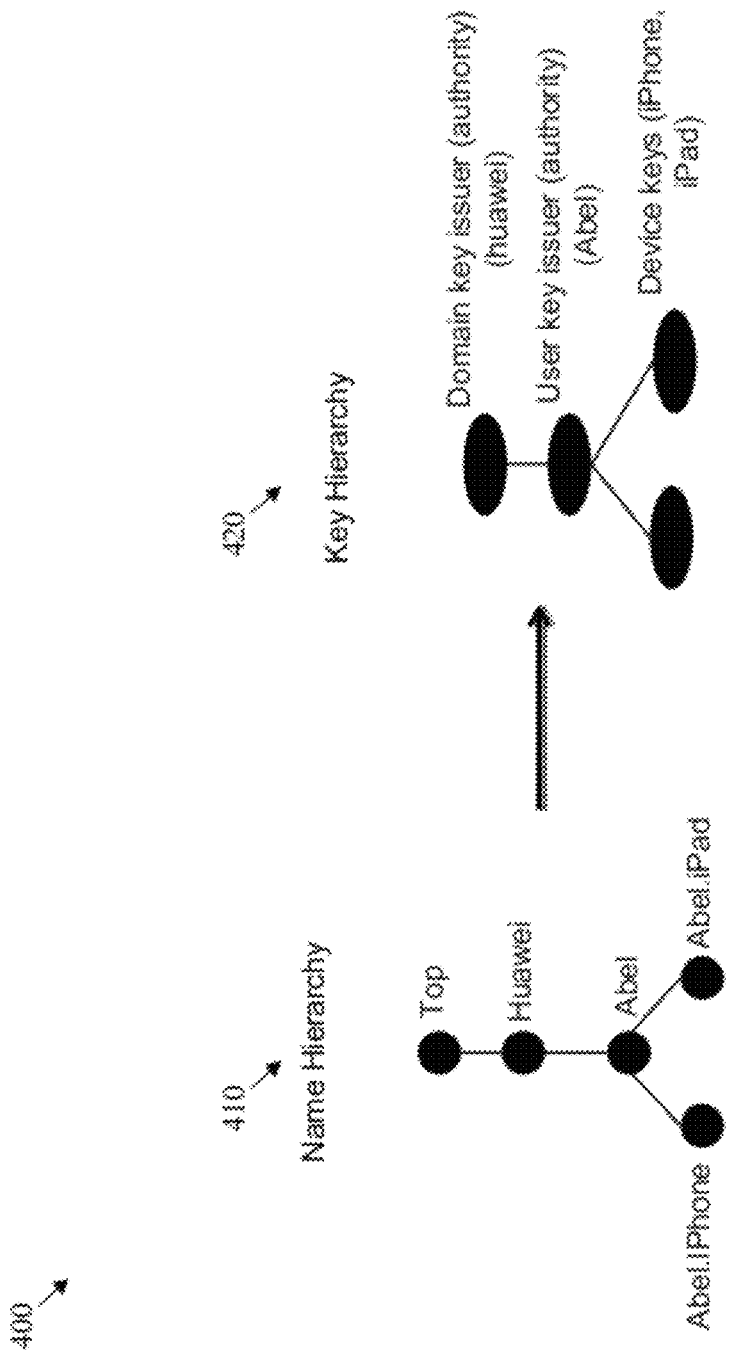
FIG. 4 is a schematic diagram of an embodiment of a name to security key mapping scheme.

FIG. 4 illustrates an embodiment of a name to security key mapping scheme 400 that may be used in a CON, e.g., similar to the CON 100, for instance as part of the SMVG control system described above. The name to security key mapping scheme 400 may be used to map between home names 410 (in a home name hierarchy) and corresponding keys 420 (in a key hierarchy). The home names 410 may be assigned from a home domain in the CON, and the keys 420 may be generated by the home SMVG controller using the home names 410. The home names 410 may be mapped to the corresponding keys 420 that may then be distributed to the corresponding devices, e.g., via the APs at the visiting access domains.

In the name to security key mapping scheme 400, the home names 410 may be used as device IDs to generate the corresponding keys 420. The device IDs or names 410 may be used to obtain public keys, e.g., using identity-based cryptography (IBC). The keys 420 may be used to secure the publication/registration of data/content between the devices. A hierarchical IBC (HIBC) may be used to derive the keys 420 based on the names 410, where the upper domain may be an intermediate key issuer (or authority). The mapped keys 420 may be a combination of a domain key user (authority), a user key issuer (authority), and a generated device key. The domain key user and the user key issuer may be obtained from the names 410. For instance, the home names 410 may be used for two user devices (mobile devices) registered for a user: top/Huawei/Abel/Abel.IPhone and top/Huawei/Abel/Abel.iPad. As such, two keys 420 may be used for the two user devices: Huawei/Abel/key1-for-IPhone and Huawei/Abel/key1-for-iPad.

The SMVG control system may also support social working groups that use the CON, e.g., the CON 100. The SMVP control system may be configured to support social grouping functions for fix-line/mobile users. A user may register his social group information (or social group locator) in the TSP profile. For example, the TSP profile may comprise entries to store user social group ID, VPN ID, social activity status, presences, and/or other related group information. The TSP may also store what "social event type" the user is interested in.

Figure 5:
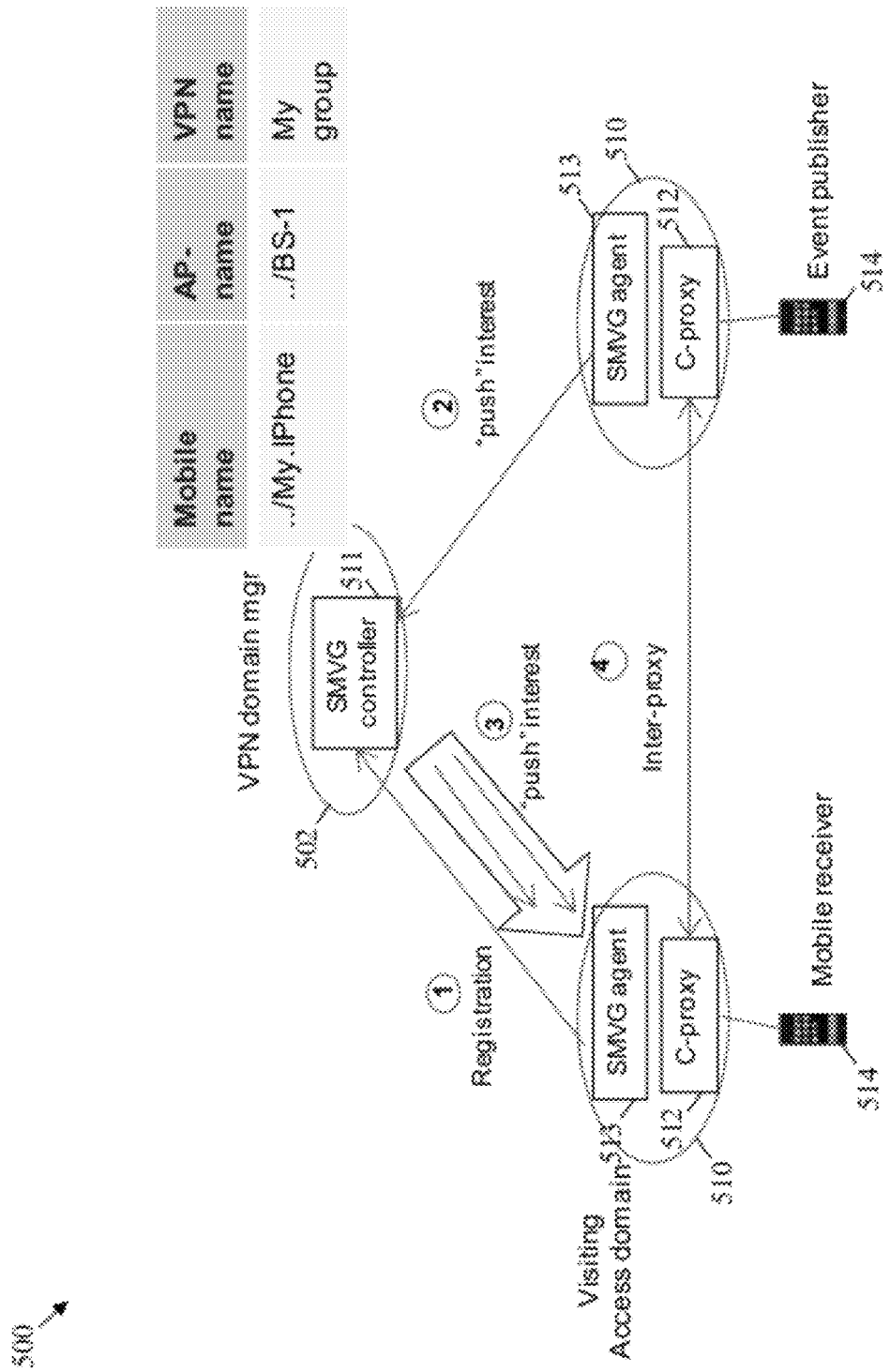
FIG. 5 is a schematic diagram of an embodiment of a push model for mobile social grouping.

FIG. 5 illustrates an embodiment of a push model for mobile social grouping 500 that may be implemented in a CON, e.g., similar to the CON 100. The push model for mobile social grouping 500 may be controlled by the SMVP control system in the CON to push events to a plurality of members in a social group. In this scenario, when an event publisher, such as a mobile device 514, puts an event into the CON (via a proxy 512), a local SMVG agent 513 (in a visiting access domain 510) may send a "push" interest to a home domain SMVG controller 511 (in a home domain 502). The SMVG controller 511 may be part of a VPN domain manager at the home domain 502. By matching the social group name (and/or the interested event type), the SMVG controller 511 may relay "push" interests to a plurality of registered mobile devices 514, e.g., at one or more visiting access domains 510. The SMVG controller 511 may communicate with the SMVG agents 513 at the visiting access domains 510 to relay the push interests. The push interests may be similar to "paging" messages, which may be received by the corresponding APs in the domains. In turn, the mobile devices 514 at the domains may be paged. The paged mobile devices 514 may then send interests to the publisher (a mobile device 514) to retrieve the event.

In this scenario, the SMVG controller 511 and the SMVG agents 513 may transmit control messages but not event data. The event data may be actually transmitted between the CON proxy nodes 512 at the different visiting access domains 510 (e.g., at data plane). While the event data is replicated at some content routers, the event data may be shared by the social members in a group if their interests travel the same path. Another advantage of this approach is energy saving. For all mobile members or devices 514 in the same social group, the members may not have to be "always on" and may periodically "pull" the event (or social status updates) to the other members. The members may be paged if some events occur. The group "paging" may benefit the mobile devices 514 due to its reduced or limited power requirement. The "paging" at content name level may also be collaborated with wireless L2 paging functions to achieve further energy saving when the mobile device 514 is in sleeping status.

In a TSP table, a social group entry may serve as a locator to a third party social domain, which may enable inter-domain service profile exchange. For example, an AT&T domain may acquire "what user like/dislike" information from a Facebook domain. When an AT&T AP pushes events to the mobile device, the AP may utilize users profile information acquired from the third party to insert some advertisement to the user's mobile devices. For instance, when a user is stepping into a Wal-Mart store, a CON proxy may push a Wal-Mart coupon into the user's IPhone. The CON proxy may also push a near-by Chinese restaurant menu to the IPhone if the CON proxy knows that the user likes Chinese food. This example shows how the SMVG control system may integrate the location and social group information to support new services.

Figure 6:
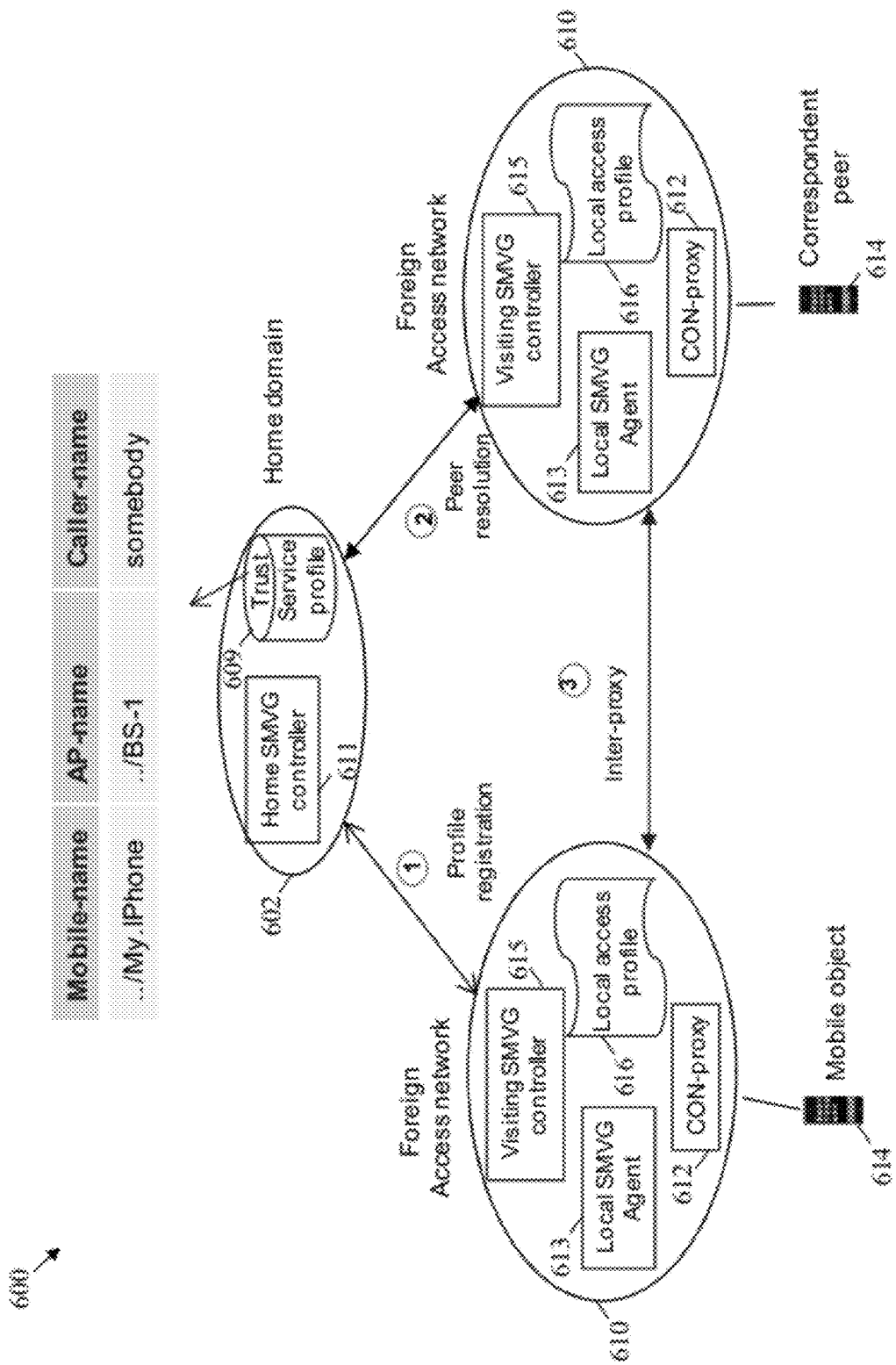
FIG. 6 is a schematic diagram of an embodiment of a multi-domain controller and agent interaction.

The SMVG control system may also implement inter-domain policy management in the CON. This inter-domain policy management may be associated with inter-domain policy profile exchange and enforcement when mobile users move between domains. FIG. 6 illustrates an embodiment of a multi-domain controller and agent interaction 600 in a CON, e.g., similar to the CON 100, that may be part of the SMVG control system. Specifically, multiple domains coupled to the CON may collaborate to enable virtual groups' members that may be distributed globally to interact with one another. Typically, social networking may be considered as an over the top (OTT) phenomenon, i.e., where the social interactions may be oblivious or invisible to the SP. Making the provider part of this interaction may enable the provider to create new services that may be customized for each virtual group needs, which may lead to improved quality of experience (QoE) support in a global context.

The domains may comprise a home domain 602 of the CON and a plurality of visiting access domains 610, which may be located at a plurality of foreign access networks coupled to the CON. The virtual groups' members may comprise mobile objects or devices 614 coupled to the foreign access networks and/or the CON. The home domain 602 may comprise a home SMVG controller 611 and a TSP database 609. Each foreign access network or visiting access domains 610 may comprise a visiting SMVG controller 615, a local SMVG agent 613, a local access profile database 616 and a local CON proxy 612. The CON proxy 612 may be coupled to the mobile device 614 via an AP (not shown).

The CON may also comprise one or more user groups (not shown) coupled to the home domain 602 and each comprising a SMVG agent, an access profile database, and a CON proxy that may be coupled to a user mobile device. The SMVG agents and the home SMVG controller 611 in the home domain 602 may interact within the home domain (intra-domain interactions) as described above. The local SMVG agents 613 may also interact similarly with the visiting SMVG controllers 615 in their corresponding visiting access domains 610 as described above. Additionally, the home SMVG controller 611 in the home domain 602 may interact with the visiting SMVG controllers 615 in their corresponding visiting access domains 610 to allow inter-domain interactions, such as to implement and/or support inter-domain policy management, inter-domain reachability, mobile registration, and service assurance, as described below.

The SMVG control system in the CON may support inter-domain reachability. Specifically, to enable interaction between the multiple domains, e.g., in a manner similar to handling IP networks, the CON's SP may examine or peer at the border points (APs) in the different domains. A control plane interaction over inter-domain routing protocols or a mutually agreed upon exchange point may be used at an AP in one domain to exchange named prefixes (for content objects, network elements, other entities) of other domains. This may allow each domain to build the reachability required to appropriately resolve IDs (names) of SMVG controllers, and allow CON proxy nodes to appropriately resolve border gateway points (APs).

The SMVG control system in the CON may also support mobile registration. Each mobile user device may be initially registered to its home SMVG controller through its home CON proxy and home SMVG agent. Once the mobile device crosses into another domain, and the associated visiting CON proxy in the new domain discovers this mobile device, the CON proxy may first check with a local inter-domain peering database to determine if the mobile device may be admitted. The CON proxy may check this using a user ID (name) that the mobile device uses to announce itself once the mobile device is within the attachment range of the CON proxy.

For example, a user from AT&T network with ~/att in its name may be verified if the user is allowed to roam in Verizon's network by checking with the network's local peering database, which may indicate the policy and agreement in place for users arriving from AT&T network. If the mobile device is allowed to roam in Verizon's network, the visiting CON proxy may first update its SMVG agent, which may interact with the local home SMVG controller (in Verizon's network) to register the roaming user. Next, the visiting SMVG agent may trigger a control plane update to the home SMVG agent of the roaming mobile device. Hence, any mobile device may set up a session with the roaming mobile device by first contacting the mobile device's own SMVG controller to determine if the roaming mobile device is in its current domain. If the request for roaming device cannot be resolved, then the SMVG controller may forward the request to the roaming mobile device's home SMVG controller, which may be able to resolve the user to the current domain. In the case where a mobile device is in a live session, and the mobile device moves into a visiting access domain (assuming the mobile user is allowed to roam in the visiting access domain), the make-before-break scheme described above may be applied to allow session continuity even after the inter-domain handover. Such interaction may also be used even in scenarios where the corresponding device does not belong to the home domain or the visiting access domain.

The SMVG system may also enable social group interaction across multiple domains, to enable group interaction among members distributed in multiple domains. In order to enable interaction among users in different domains, the TSPs in different domains may collaborate to instantiate group profiles supported within their own domains. Such instantiation may typically require the operator's intervention to populate the appropriate policies that would enable TSPs from different domains to interact with each other. The control plane exchange of information may enable each TSP to build group profile information. From a practical perspective, it may not be necessary for a TSP to support all the groups. The group profile information may also be modified dynamically either through an operator's intervention or an application/third party level trigger mechanism.

With the group profile information instantiated, the group profile information may be applied against the mobile users (mobile devices) either at their home domains or at a foreign domain. For the roaming users, the group policy rules may be applied as follows: whenever a mobile user device with corresponding group affiliations enters a visiting domain, e.g., during the process of registration with the visiting SMVG controller, the user may submit the users group credentials (in addition to its name ID). The SMVG controller may compare the groups in the submitted user group information with the groups that are supported in its own domain. From the groups that are submitted, the SMVG controller may honor a subset of groups. Once the set of groups supported within the visiting domain are identified, the visiting SMVG controller may notify the home SMVG controller (of the roaming device) about the new visiting CON proxy that the mobile device is attached to, and of the group interaction the visiting SMVG controller may support. This may allow the home SMVG controller to forward a group's members request to setup new sessions or enable "push" actions to be flooded to members of the same group even they are at different domain.

The SMVG control system may also provide service assurance to honor any agreement in place to provide a service guarantee, such as when users of a group roam between domains. The SMVG control system may enable the CON to deliver content with guarantees with respect to QoS, reliability, availability, and security of the content exchanged between the domains. The model of ensuring fine granular QoS and efficient content distribution may also be extended across the peering points (APs).

Figure 7:
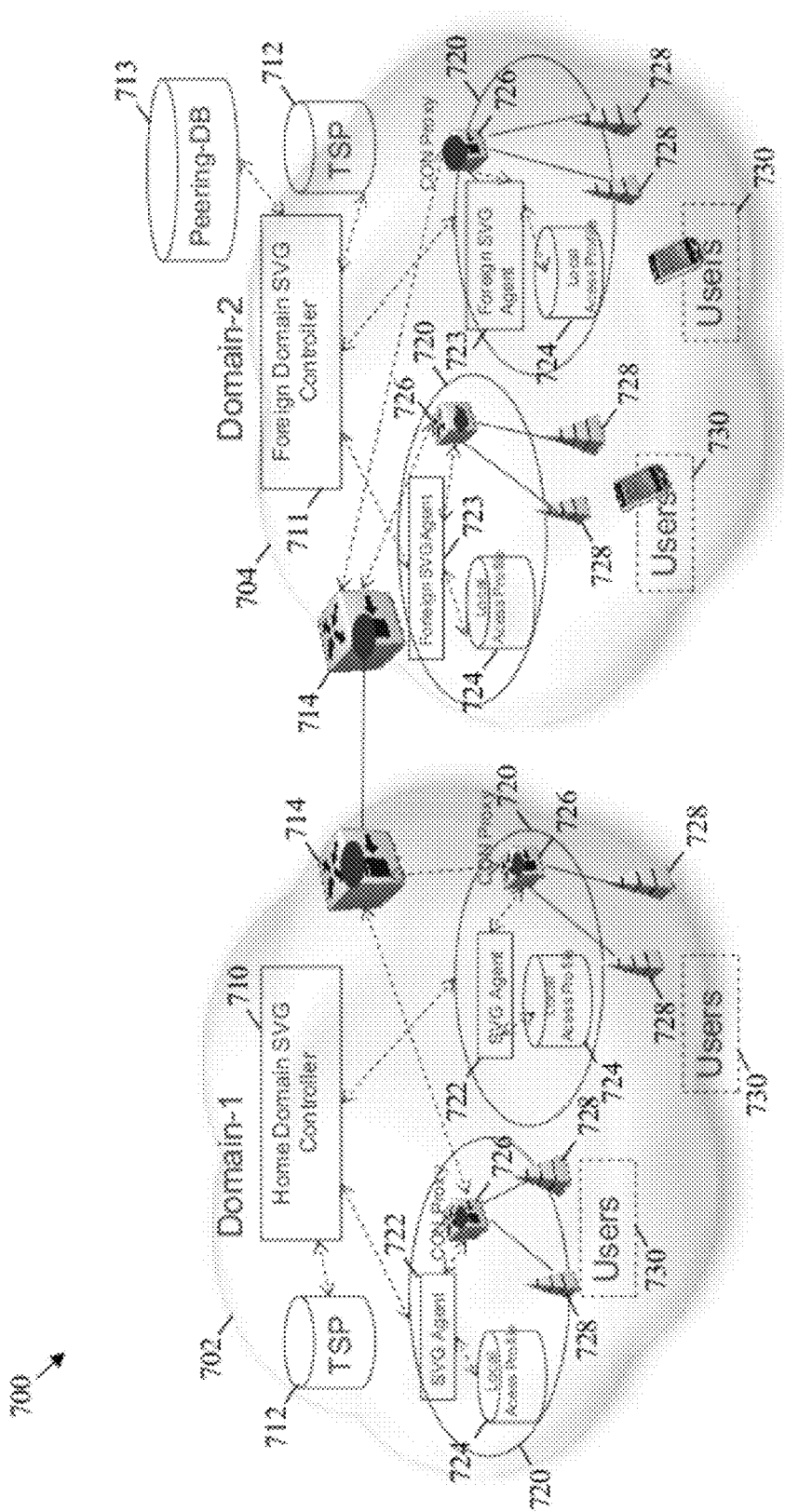
FIG. 7 is a schematic diagram of an embodiment of a multi-domain service assurance framework.

FIG. 7 illustrates an embodiment of a multi-domain service assurance framework 700 in a CON, e.g., similar to the CON 100, which may use VPGs. The VPG instances in the CON may be instantiated across peering points. This may allow any inter-domain content dissemination to occur within the context of the group profiles defined in the content routers. The CON may be coupled to a plurality of domains, including a first domain 702 (Domain-1) and a second domain 704 (Domain-2). The first domain 702 may comprise a home domain SMVG controller 710, a TSP database 712, and a plurality of user groups 720. Each user group 720 may comprise a SMVG agent 722, a CON proxy 726, a local access profile database 724, and a plurality of APs 728 that may attach to mobile devices 730. At least one content router 714 in the first domain 702 may be coupled to another content router 714 in the second domain 704.

The second domain 704 may comprise a foreign (or visiting) domain SMVG controller 711, another corresponding TSP database 712, and a plurality of corresponding user groups 720. Each corresponding user group 720 may comprise a foreign (or visiting) SMVG agent 723, a CON proxy 726, a local access profile database 724, and a plurality of APs 728 that may attach to mobile devices 730. The components of the first domain and the second domain may be configured substantially similar to the corresponding components of the CON 100, and may be arranged as shown in FIG. 7. The foreign SMVG agents 723 may also be coupled to a peering database (DB) 713, which may be a local inter-domain peering database used to determine if a mobile device may be admitted into the second domain 704. The peering DB 713 may comprise information about the mobile device 730, e.g., similar to the information available at the first domain 702. The home domain SMVG controller 710, foreign domain SMVG controller 711, SMVG agents 722, foreign SMVG agents 723, and corresponding CON proxy nodes 726 in both domains may communicate with each other to enable inter-domain interactions as described above.

Figure 8:
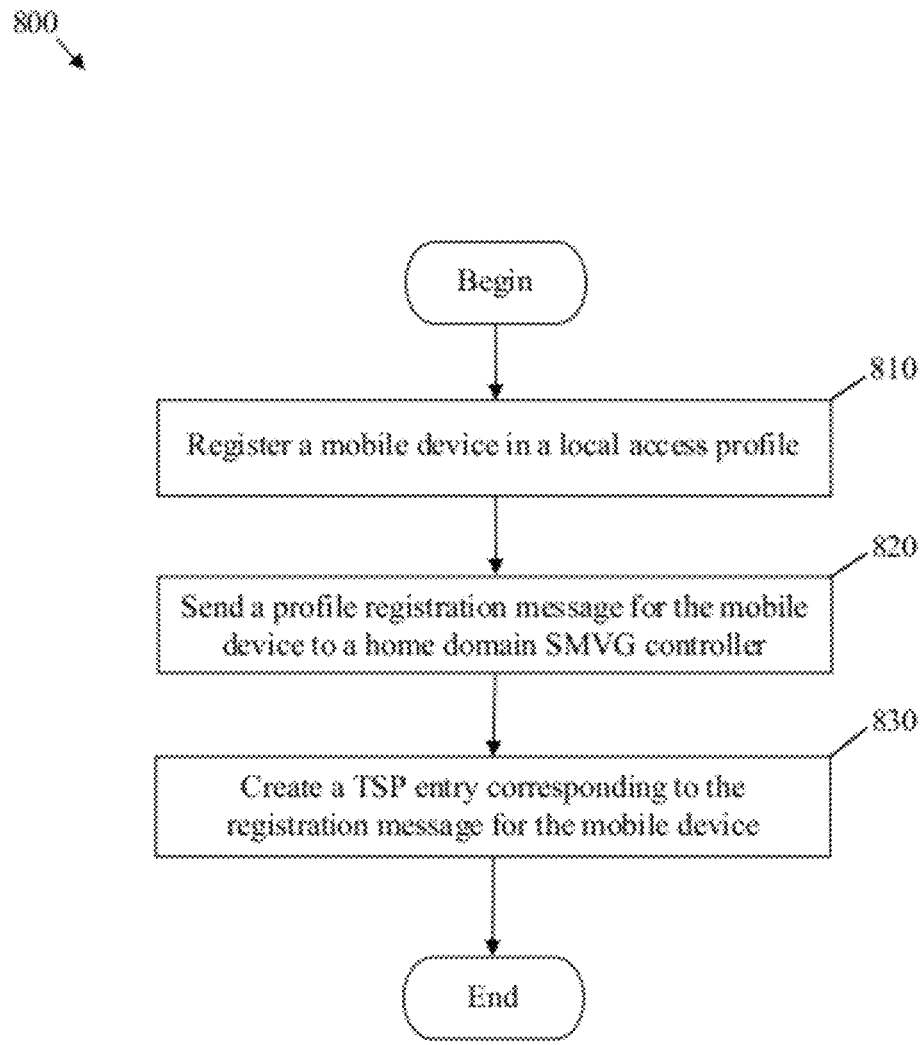
FIG. 8 is a flow chart of another embodiment of a device registration method.

FIG. 8 illustrates an embodiment of a device registration method 800, which may be implemented by the SMVG control system, e.g., in the CON 100. The method may begin at block 810, where a mobile device may be registered in a local access profile. The mobile device may attach via an AP to a home domain of the CON or a visiting access domain (e.g., in a visiting or foreign access network coupled to the CON). The AP may authenticate the mobile device/device user and derive the home domain from the prefix of the mobile device's name. The local SMVG agent may then register the mobile device in a local access profile. At step 820, a profile registration message for the mobile device may be sent to a home domain SMVG controller. The home domain SMVG controller may be identified based on the home domain derived for the mobile device. The home domain SMVG controller may be located in the same domain that the mobile device is attached to, e.g., in the case of an intra-domain registration scenario, or in a separate domain, e.g., in the case of an inter-domain registration scenario.

At block 830, a TSP entry corresponding to the registration message may be created for the mobile device. The TSP entry may comprise registration information for the mobile device indicated in the registration message and/or obtained from the forwarded name in the message. The TSP entry may be entered in a TSP database or table at the home domain that is coupled to the SMVG controller. The TSP entry may comprise binding information between the mobile device and the AP attached to the mobile device. The TSP entry may comprise the name of the AP attached to the mobile device that indicates the location of the mobile device and that may be globally routable in the CON. The method 800 may then end.

Figure 9:
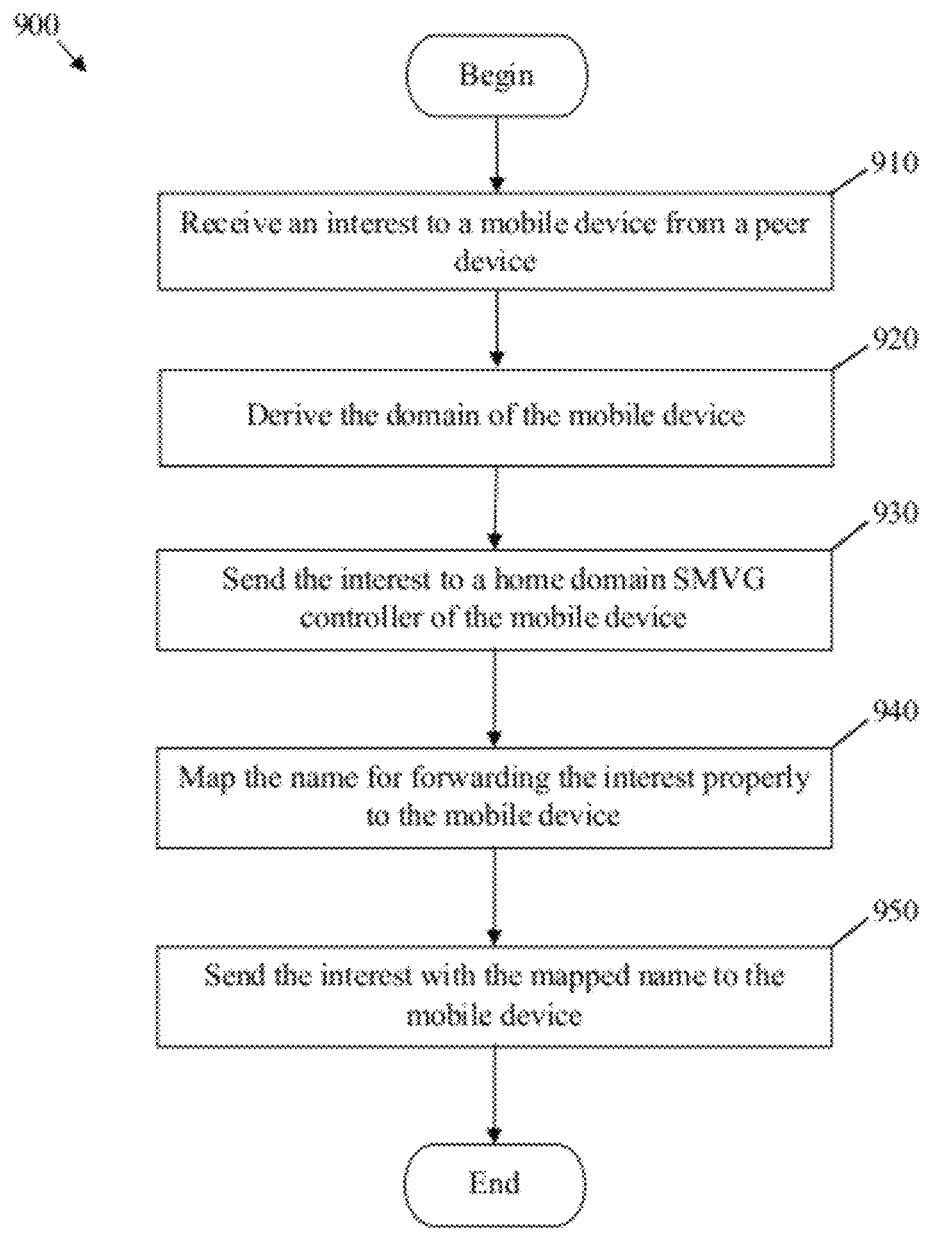
FIG. 9 is a flow chart of another embodiment of an inter-domain interest forwarding method.

FIG. 9 illustrates an embodiment of an inter-domain interest forwarding method 900, which may be implemented by the SMVG control system, e.g., in the CON 100. The method may begin at block 910, where an interest to a mobile device may be received from a peer device. The interest may be a voice call request sent to the mobile device (called party) by the peer device (caller). A SMVG agent at the local domain of the peer device may receive the interest. At block 920, the domain of the mobile device may be derived. The SMVG agent may derive the home domain name of the mobile device from the name of the mobile device in the received interest. At block 930, the interest may be sent to the home domain SMVG controller of the mobile device. The SMVG agent may send the interest to the determined home domain SMVG controller of the mobile device, which may be located in a separate domain than the peer device. The interest may be sent first to a local home domain SMVG controller corresponding to the local SMVG agent and the peer device before being forwarded to the home domain SMVG controller of the mobile device. For instance, when the peer device is in a separate network than the mobile device, each network may have its own home domain SMVG controller.

At block 940, the name for forwarding the interest properly to the mobile device may be mapped. The home domain SMVG controller of the mobile device (or the local home domain SMVG controller of the peer device) may map the name in the interest before sending the interest to the mobile device, e.g., using the TSP database. The name may be mapped to indicate the proper AP attached to the called mobile device in the proper destination or target domain. At block 950, the interest may be sent with the mapped name to the mobile device. The interest may be forwarded by the home domain SMVG controller, the SMVG agent, and then the CON proxy of the domain where the mobile device is attached based on the mapped name information. The method 900 may then end.

Figure 10:
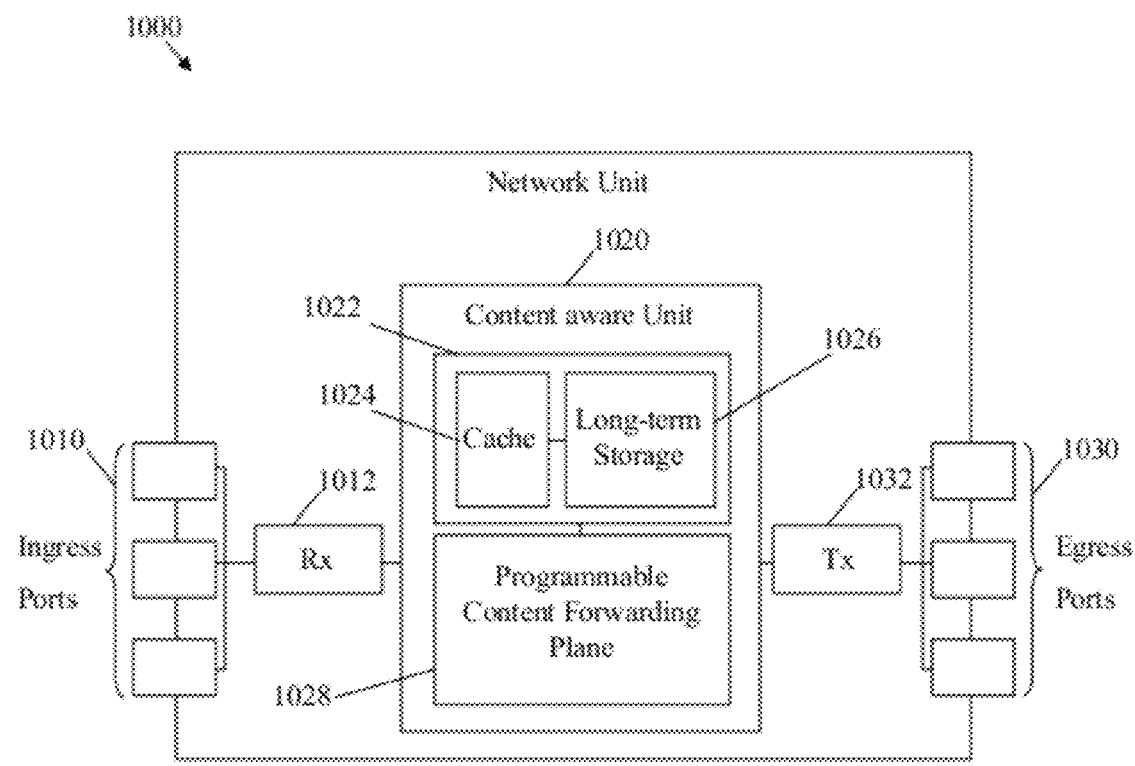
FIG. 10 is a schematic diagram of an embodiment of a network unit.

FIG. 10 illustrates an embodiment of a network unit 1000, which may be any device that transports and processes data through a network. For instance, the network unit 1000 may be located in the content router or any node in the CON 100, or any node in the schemes described above. The content router may also be configured to implement or support the CON systems and methods described above. The network unit 1000 may comprise one or more ingress ports or units 1010 coupled to a receiver (RX) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (TX) 1032 for transmitting signals and frames/data to the other network components. The receiver 1012, content aware unit 1020, and transmitter 1032 may also be configured to implement at least some of the disclosed schemes and methods, which may be based on hardware, software, or both. The components of the network unit 1000 may be arranged as shown in FIG. 10.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in a content table at the content aware unit 1020 or the network unit 1000. The programmable content forwarding plane block 1028 may interpret user requests for content and accordingly fetch content, e.g., based on meta-data and/or content name, from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2. The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 11:
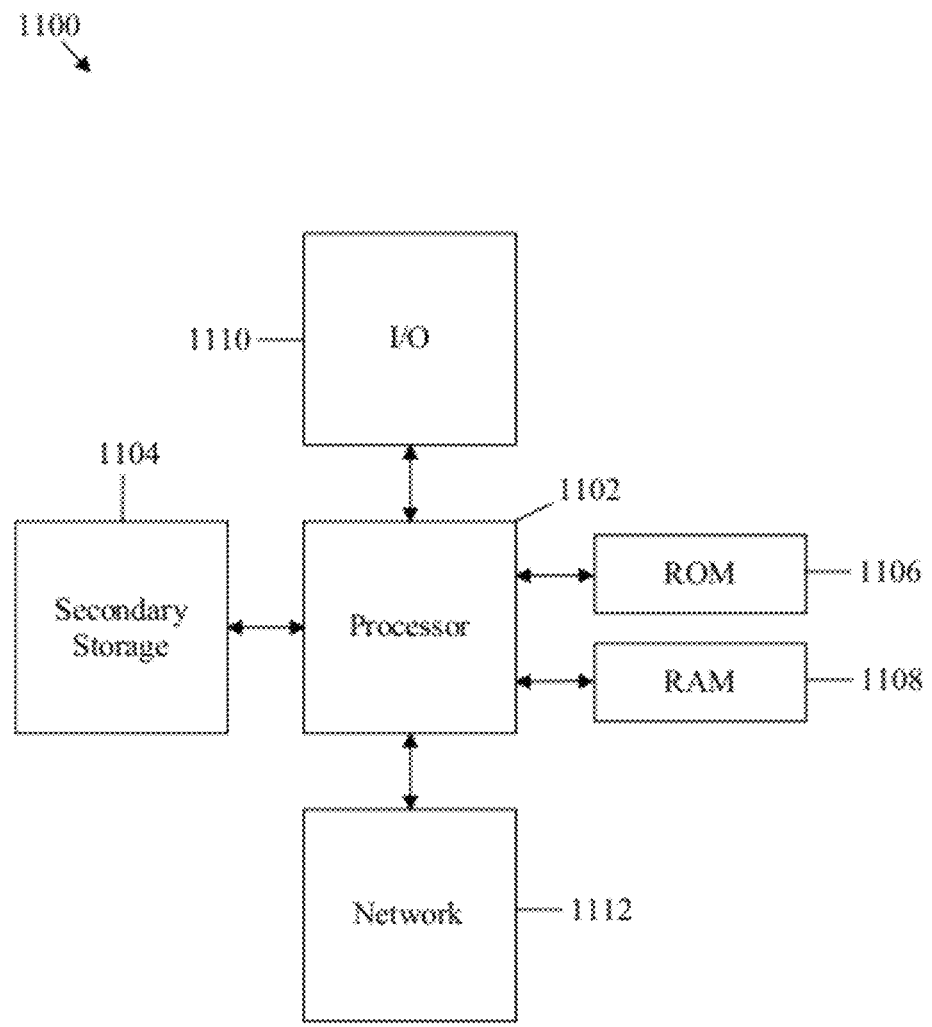
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 9 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 90 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 90 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component operating at a control plane comprising:
   a receiver configured to receive a request through an information centric network, wherein the request is associated with a user device in a user group;
   a virtual group controller configured to operate at the control plane to determine a domain for the user device based on a domain name obtained from the request, route the request by mapping a name for the user device in the request using trusted service profile information; and
   a transmitter configured to forward the request to the domain for the user device,
   wherein the virtual group controller provides user device name registration and management and name mapping to enable user mobility and manage network global routing, and
   wherein the name mapping is used to map a user device home name hierarchy assigned from a home domain and comprising a home domain name, the user of the device name, and the user device name into a user device foreign name hierarchy routable in a foreign domain and comprising a foreign domain me a radio access network (RAN) access technologyname for an access point (AP) attached to the user device in the foreign domain, the home domain name, the user of the device name, and the user device name.

2. The network component of claim 1, wherein the virtual group controller provides social grouping using the trusted service profile information that indicates a plurality of user groups, their associated user devices, and APs attached to the user devices.

3. The network component of claim 1, wherein the virtual group controller provides inter-domain policy management, inter-domain reachability, and inter-domain social interaction by interacting with a plurality of trusted service profiles positioned in a plurality of domains.

4. The network component of claim 1, wherein the virtual group controller is further configured to enable security, mobility, and social grouping services for the user group using domain-based naming.

5. A network component operating at a control plane comprising:
   a receiver configured to receive a request through an information centric network, wherein the request is associated with a user device in a user group;
   a virtual group controller configured to operate at the control plane to determine a domain for the user device based on a domain name obtained from the request, route the request by mapping a name for the user device in the request using trusted service profile information; and
   a transmitter configured to forward the request to the domain for the user device, wherein the virtual group controller provides mapping and distributing keys based on user names to maintain user content security and name certification, and wherein mapping keys are used to map a user device home name hierarchy assigned from a home domain and comprising a home domain name, a name of a user of the device, and the user device name into a key for securing publication/subscription of content data for the user device and comprising the home domain name, the user of the device name, and a key generated based on the user device name and using identity-based cryptography (IBC).

6. The network component of claim 5, wherein the virtual group controller provides social grouping using the trusted service profile information that indicates a plurality of user groups, their associated user devices, and access points (APs) attached to the user devices.

7. The network component of claim 5, wherein the virtual group controller provides inter-domain policy management, inter-domain reachability, and inter-domain social interaction by interacting with a plurality of trusted service profiles positioned in a plurality of domains.

8. The network component of claim 5, wherein the virtual group controller is further configured to enable security, mobility, and social grouping services for the user group using domain-based naming.

9. A method implemented on a network component for providing an interest to a mobile device, comprising:

receiving, at a virtual group controller operating in a control plane in an information centric network, a request to the mobile device from a group proxy, wherein the group proxy receives the request from a peer device;

mapping with the virtual group controller the request to an access point for the mobile device using a trusted service profile for the mobile device, wherein mapping comprises creating a mapping between a home name hierarchy associated with the mobile device in a home domain and foreign name hierarchy routable in a foreign domain associated with the access point, wherein the home name hierarchy comprises a home domain name, a user name, and a mobile device name, and wherein the foreign name hierarchy comprises a foreign domain name, a radio access network (RAN) access technology name for the access point, the home domain name, the user name, and the mobile device name; and sending, with the virtual group controller, the request to the access point for the mobile device.

10. The method implemented of claim 9 further comprising:

registering a second mobile device that attaches to a first network domain in a local access profile of the first network domain;

sending a profile registration message for the second mobile device to a virtual group controller associated with a second network domain; and creating an entry for trusted service profile corresponding to the registration message for the second mobile device.

11. The method of claim 10, wherein the second network domain is a home network domain for the second mobile device.

12. The method of claim 10, wherein the trusted service profile entry comprises binding information between the second mobile device and a second access point in the first network domain.

13. The method of claim 12, wherein the trusted service profile entry further comprises a name of the second access point that indicates a location of the second mobile device and that is globally routable in a content oriented network.

* * * * *

UNITED STATES PATENT AND TRADEMARK OFFICE
CERTIFICATE OF CORRECTION

PATENT NO. : 8,881,236 B2
APPLICATION NO. : 13/352835
DATED : November 4, 2014
INVENTOR(S) : Guoqian Wang et al.

It is certified that error appears in the above-identified patent and that said Letters Patent is hereby corrected as shown below:

In the Claims

Column 18, Lines 36-37, Claim 1 should read:
wherein the name mapping is used to map a user device home name hierarchy assigned from a home domain and comprising a home domain name, the user of the device name, and the user device name into a user device foreign name hierarchy routable in a foreign domain and comprising a foreign domain name, a radio access network (RAN) access technology name for an access point (AP) attached to the user device in the foreign domain, the home domain name, the user of the device name, and the user device name.

Signed and Sealed this
Sixth Day of June, 2017

Michelle K. Lee
*Director of the United States Patent and Trademark Office*